US012688750B2

(12) United States Patent
Froy et al.

(10) Patent No.: US 12,688,750 B2
(45) Date of Patent: Jul. 21, 2026

(54) PROVIDING WAGERING GAMES IN A HOLOGRAPHIC DISPLAY SYSTEM

(71) Applicant: IGT, Las Vegas, NV (US)

(72) Inventors: David Froy, Lakeville-Westmorland (CA); Stefan Keilwert, St. Josef (AT); Michael Russ, Graz (AT)

(73) Assignee: IGT, Las Vegas, NV (US)

( * ) Notice: Subject to any disclaimer, the term of this patent is extended or adjusted under 35 U.S.C. 154(b) by 223 days.

(21) Appl. No.: 18/522,165

(22) Filed: Nov. 28, 2023

(65) Prior Publication Data

US 2025/0174070 A1 May 29, 2025

(51) Int. Cl.
*G07F 17/32* (2006.01)
*G03H 1/22* (2006.01)

(52) U.S. Cl.
CPC .......... *G07F 17/3211* (2013.01); *G03H 1/22* (2013.01)

(58) Field of Classification Search
None
See application file for complete search history.

(56) References Cited

U.S. PATENT DOCUMENTS

| | | | | |
|---|---|---|---|---|
| 2016/0093154 A1* | 3/2016 | Bytnar | ................ | G07F 17/3237 |
| | | | | 463/25 |
| 2021/0287487 A1* | 9/2021 | Hilbert | ................ | G07F 17/3241 |
| 2022/0092943 A1* | 3/2022 | Piazza | ................ | G07F 17/3241 |
| 2025/0104503 A1* | 3/2025 | Froy | ....................... | G07F 17/34 |

FOREIGN PATENT DOCUMENTS

| | | | | |
|---|---|---|---|---|
| KR | 20200130024 A | 11/2020 | | |
| WO | 2008/097469 A3 * | 8/2008 | | |
| WO | WO-2008097469 A2 * | 8/2008 | .......... | G07F 17/3211 |
| WO | 2009062153 * | 5/2009 | | |
| WO | WO-2009062153 A1 * | 5/2009 | ............. | G07F 17/32 |

* cited by examiner

*Primary Examiner* — Ronald Laneau
(74) *Attorney, Agent, or Firm* — Spencer Fane LLP; William M. Kelly

(57) ABSTRACT

A position and an orientation of a player in a player area surrounded by a three-dimensional holographic display device is determined. The display device displays a first wagering game and a second wagering game based on the position and the orientation of the player to position the first wagering game in a central field of view of the player and to position the second wagering game in a peripheral field of view outside the central field of view. A game event is determined in the second wagering game. Based on the determined game event, the display device moves the second wagering game to position the second wagering game in the central field of view of the player.

20 Claims, 12 Drawing Sheets

300    302    304    306    308                    310

700

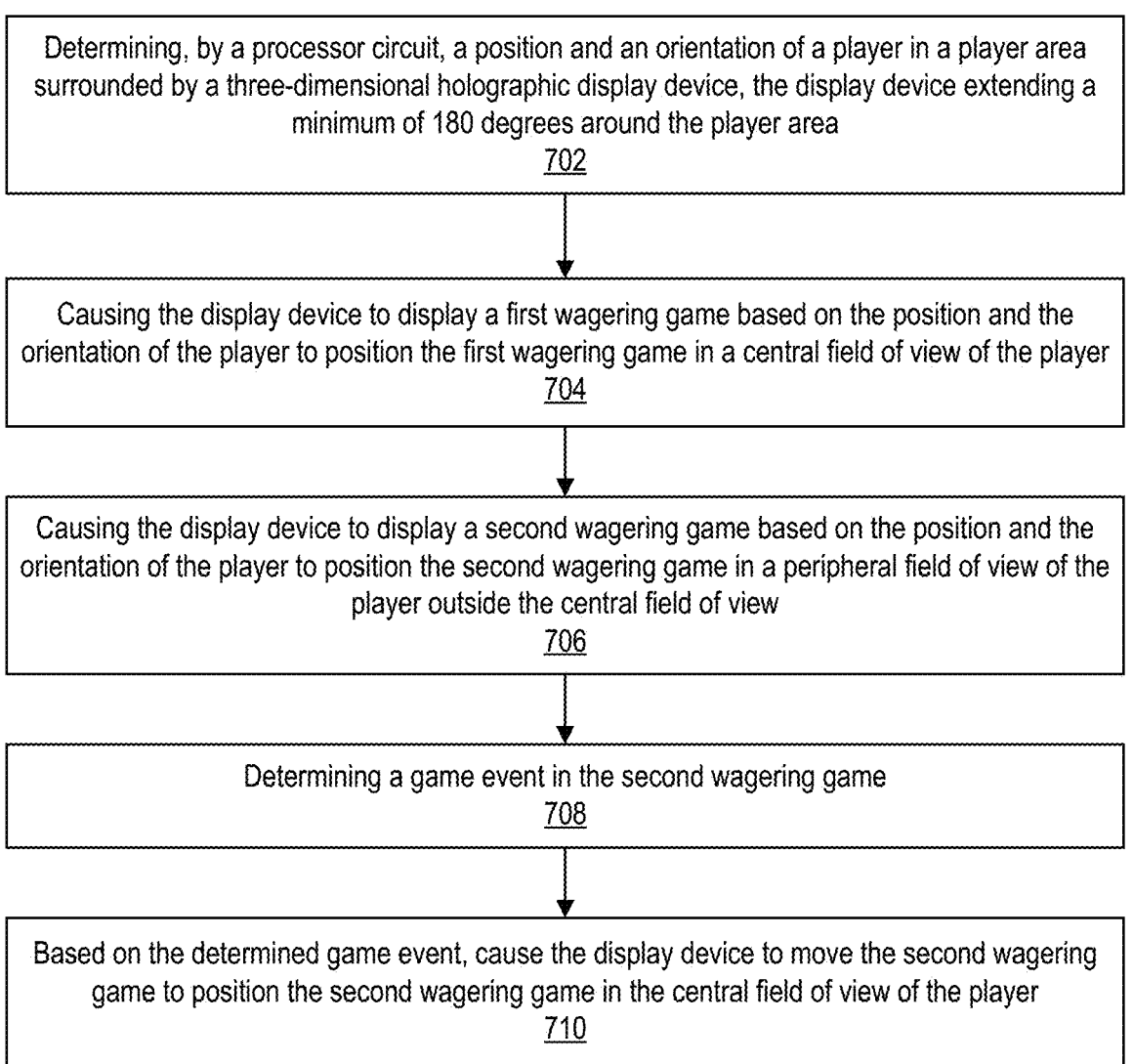

Determining, by a processor circuit, a position and an orientation of a player in a player area surrounded by a three-dimensional holographic display device, the display device extending a minimum of 180 degrees around the player area
702

Causing the display device to display a first wagering game based on the position and the orientation of the player to position the first wagering game in a central field of view of the player
704

Causing the display device to display a second wagering game based on the position and the orientation of the player to position the second wagering game in a peripheral field of view of the player outside the central field of view
706

Determining a game event in the second wagering game
708

Based on the determined game event, cause the display device to move the second wagering game to position the second wagering game in the central field of view of the player
710

*FIG. 7*

PROVIDING WAGERING GAMES IN A HOLOGRAPHIC DISPLAY SYSTEM

BACKGROUND

Embodiments described herein relate to a display system, and in particular to providing wagering games in a holographic display system in a gaming environment, such as a casino environment, and related devices, systems, and methods. Many companies are developing display technologies that provide more immersive experiences for users. There is a need for a unique technical solution to the technical problem of providing a more realistic and desirable experience for users in a gaming environment, to increase immersion and enhance enjoyment for new and returning players.

BRIEF SUMMARY

According to some embodiments, a system includes a processor circuit and a memory coupled to the processor circuit. The memory includes machine-readable instructions that, when executed by the processor circuit, cause the processor circuit to determine a position and an orientation of a player in a player area surrounded by a three-dimensional holographic display device, the display device extending a minimum of 180 degrees around the player area. The instructions further cause the processor circuit to cause the display device to display a first wagering game based on the position and the orientation of the player to position the first wagering game in a central field of view of the player. The instructions further cause the processor circuit to cause the display device to display a second wagering game based on the position and the orientation of the player to position the second wagering game in a peripheral field of view of the player outside the central field of view. The instructions further cause the processor circuit to determine a game event in the second wagering game. The instructions further cause the processor circuit to, based on the determined game event, cause the display device to move the second wagering game to position the second wagering game in the central field of view of the player.

According to some embodiments, a gaming device includes a three-dimensional holographic display device extending a minimum of 180 degrees around a player area, a processor circuit and a memory coupled to the processor circuit. The memory includes machine-readable instructions that, when executed by the processor circuit, cause the processor circuit to, based on receipt of a first wager from a second player in the player area for a first wagering game, display a first game board for a first wagering game. The instructions further cause the processor circuit to, based on receipt of a second wager from a second player in the player area for a second wagering game, display a second game board for a second wagering game. The instructions further cause the processor circuit to, based on a player input from the first player and the second player, combine the first game board and the second game board into a combined game board for a combined wagering game. The instructions further cause the processor circuit to determine a combined game result for the combined wagering game based on the combined game board. The instructions further cause the processor circuit to, based on a determination that the combined game result is a winning game result, provide a first game award to the first player based on the first wager and a second game award to the second player based on the second wager.

According to some embodiments, a gaming device includes a three-dimensional holographic display device extending a minimum of 180 degrees around a player area, a processor circuit and a memory coupled to the processor circuit. The memory includes machine-readable instructions that, when executed by the processor circuit, cause the processor circuit to cause the display device to display a plurality of horizontal reels for a wagering game, each reel comprising a plurality of game symbols, each reel extending a minimum of 180 degrees around the player area. The instructions further cause the processor circuit to, based on receipt of a wager from a player in the player area for the wagering game, animate the plurality of reels so that the plurality of reels appear to be spinning horizontally around the player area. The instructions further cause the processor circuit to, based on a rest position of the plurality of reels after the animation, determine a game result for the wagering game. The instructions further cause the processor circuit to, in response to the game result being a winning game result, provide a game award to the player.

BRIEF DESCRIPTION OF SEVERAL VIEWS OF THE DRAWINGS

FIG. 7 is a flowchart illustrating operations of systems/methods of providing a plurality of wagering games in a holographic display system, according to some embodiments.

DETAILED DESCRIPTION

Figure 1:
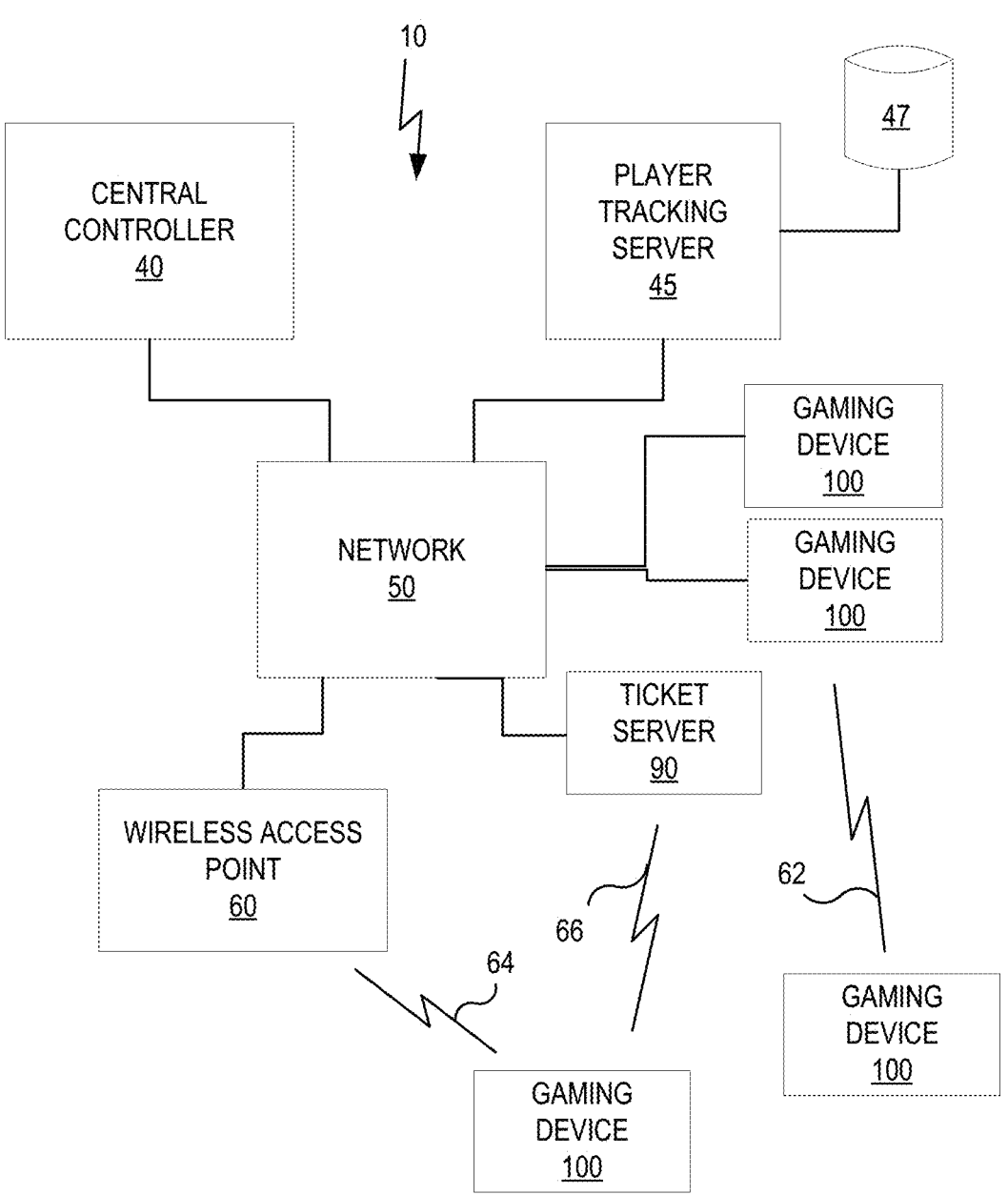
FIG. 1 is a schematic block diagram illustrating a network configuration for a plurality of gaming devices according to some embodiments.

According to some embodiments, a gaming device display surrounds an enclosed area, e.g., up to 360 degrees. In some examples, the display may be made up of one or more panels arranged in a plane parallel to the floor, with reflective glass placed over the panel at a 45-degree angle. Graphics displayed on the display panels are projected onto the angled glass, and are reflected toward the user's field of view.

In some examples, cameras can track the player and/or aspects of the player, e.g., head position, gaze direction, body posture, etc., and may capture gestures by the player, which may be used as input in addition to or as an alternative to hardware input devices, such as buttons. Head tracking, gaze tracking, and/or body tracking may also be used as input, as desired.

By positioning display devices horizontally below the angled glass, the optical path between the user and the display is increased, which may allow for a greater perception of depth and may allow for free-floating graphics in a more realistic and immersive virtual environment. In some examples, a main screen of an EGM or other gaming device may be displayed using a mapping wavefront display which may map to a human eye, i.e., the user's eye, to maintain the main screen in the user's field of view.

In some examples, the immersive display may provide a destination experience in combination with three dimensional audio effects, body tracking, and/or voice recognition, to create a unique user experience for users and which may attract new players to gaming venues.

In some examples, the gaming device display system may include a holographic display, a depth-sensing camera system to track user body motion and location, a microphone array to detect the user's voice as input for the system, and a processor based computing system for operating and coordinating the different hardware components to create a more seamless experience, as well as the ability to provide multiple gaming experiences at once.

In some embodiments, a series of slanted glass panels may be arranged in a circular array around a central user area, wherein an image is projected upon the panels from below using either a series of display devices, such as projectors, LED displays, OLED displays, or other light emitting devices. In some examples, the glass may be curved inwardly at a substantially 45-degree angle as allow an image to appear as if it is floating in midair. The glass may be transparent or semi-transparent, such that the user can still see the outside world with the projected images floating in front, or the glass may be fully reflective, such that the projected images appear to make up the entire immersive environment. In some examples, a user may enter the display area from a rear opening, which may include a door with an additional display surface to fill the opening and create a full 360 degree immersive environment.

One or more depth sensing camera systems may be employed surrounding the user, who stands in the center of the display area, to allow the creation of a depth map and/or point cloud, which may in turn be used to generate a skeletal model for a tracking and/or gesture system, such that user gestures and positions can be used as additional user input, as desired.

In some examples, a microphone array may be used for a voice recognition system in which the user may be able to give commands or interact with a game, virtual objects, and/or virtual persons in the environment. In some embodiments, a machine learning and/or voice recognition system may analyze the user's voice for triggering events in the game or actions by the user.

In some examples, multiple speakers may be arranged around the user area, to project a binaural and/or spatial audio experience, allowing for a 360 degree surround sound experience for the user.

In some embodiments, game play in the display environment may allow for multiple game screens to surround the user allowing the user to play multiple games at once in the surrounding display. For example, the user may virtually move through a virtual casino space using gestures to different virtual EGMs to play different games. In some examples, a user may move from one game to a new active game without the need for hiding or minimizing the previous inactive game. In some embodiments, the inactive game may move to a new position outside a user's central field of view. In some examples, the display area may include a plurality of predefined game positions, with one or more game positions in the user's field of view, which may be based on a line of sight of a detected gaze direction of the user. The field of view may include several different zones, such as one or more central fields of view and one or more peripheral fields of view, for example. In some examples, the inactive game may be moved to a peripheral field of view so that the game is still visible. In this manner, the user can still see what's going on in the other inactive game, e.g., in their corner of the eye, or by turning their head without the need for an additional input and/or user interface interaction by the user. In some examples, other areas around the player can display additional content, such as additional wagering games, streams of other sports, horse racing etc. on virtual displays with betting options, entertainment content, etc.

In some examples, unique game experiences may be provided, such as a slot-style game with horizontal reels that move side to side, surrounding the user and moving in the same or different directions. In some examples, the user may wager on game results of some or all of the reels, such as a reel or reels being focused on by the user when the wager is placed, for example. In some examples, skill-based games may be provided, such as games to hit virtual objects to collect possible prizes, e.g., popping bubbles, breaking balloons, hitting enemies that are swarming the player, virtual fly swatter, etc. In some examples, a virtual bingo game may display numbers being called and may allow the user virtually stamp multiple cards being displayed in the environment. In some examples, traditional casino games may be simulated, such as slot games, table games, poker, sports wagering, etc. In some examples, the user may virtually interact with a sporting event, such as virtually riding a horse in a horse race for example. In some examples, the user may interact with virtual avatars which the user can view in the display, and which may be controlled by the system, e.g., by artificial intelligence, and/or by other real world users in different locations.

In some examples, presence and/or player detection hardware may cause a displayed game to be positioned and move based on the user's location, position, orientation, etc., within the display area. For example, the system may detect when a player sits or stands and may reposition the game to keep the game in the user's field of view, or portion thereof.

In some examples, multiple users in the display area may interact with the system. For example, two users may play two different games, and may have the option to combine their games, e.g., combining two separate 5-reel matrices into a combined 10-reel matrix. In some examples, the system may provide an incentive to combine the games, such as a reduced wager requirement for playing the game and/or qualifying for a bonus jackpot or other game features, increased potential payouts, enhanced paytables, eligibility for additional features such as a bonus jackpot, increased likelihood of receiving bonus trigger and/or special symbols, etc. In some examples, winnings for the combined game may be evenly split between the player or may be distributed differently based on additional criteria, such as bet size, player status, etc., as desired.

In some examples, game elements and other user interface elements may be repositioned, resized, and/or hidden by the player (e.g., by drag and drop, virtual touch, etc.) as desired, such as credit meters, bet meters, line selections, jackpots, reels, message lines, digital buttons, etc. Preferred user interface configurations may be stored in the user's profile and/or tied to the user's player account, and may be retrieved based on identification of the user by the system. In some examples, user interface elements may be dynamically resized or repositioned, e.g., to draw the user's attention to a particular element. For example, a user playing multiple games may focus on a particular game, and the system may draw the user's focus to another active game requiring interaction.

In some examples, interaction with the virtual environment may be tied to user presence, e.g., continuous presence detection, with gameplay being locked or restricted if the user is not detected for a predetermined amount of time. Continuous presence detection may also facilitate repositioning user interface elements in response to player movement, e.g., sitting down, standing up, changing orientation, to maintain relevant interface elements at desired locations in the user's field of view.

In some examples, dynamic game audio may be provided. For example, the system may detect a portion of the display being focused on by the user, e.g., an active game, environmental object, virtual person, etc., and may increase audio volume associated with those elements and/or reduce audio volume of other elements. Focus detection may be based on an area of interaction (e.g., pressing physical or virtual buttons), rotation of a chair and/or head position, gaze detection, etc. For example, the system may detect that a player's focus has shifted from one game to another game, and may increase the game volume for the second game while reducing game volume for the first game. In some examples, the system may dynamically increase volume for certain games and/or events outside the user's focus, e.g., to draw the user's attention to those elements, such as important game events, large wins, required user interactions, etc. In this manner, these and other embodiments provide a unique technical solution to the technical problem of providing a more realistic and desirable experience for users in a gaming environment, to increase immersion and enhance enjoyment for new and returning players.

Before describing these and other features in greater detail, reference is now made to FIG. 1, which illustrates a gaming system 10 including a plurality of gaming devices 100. The gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
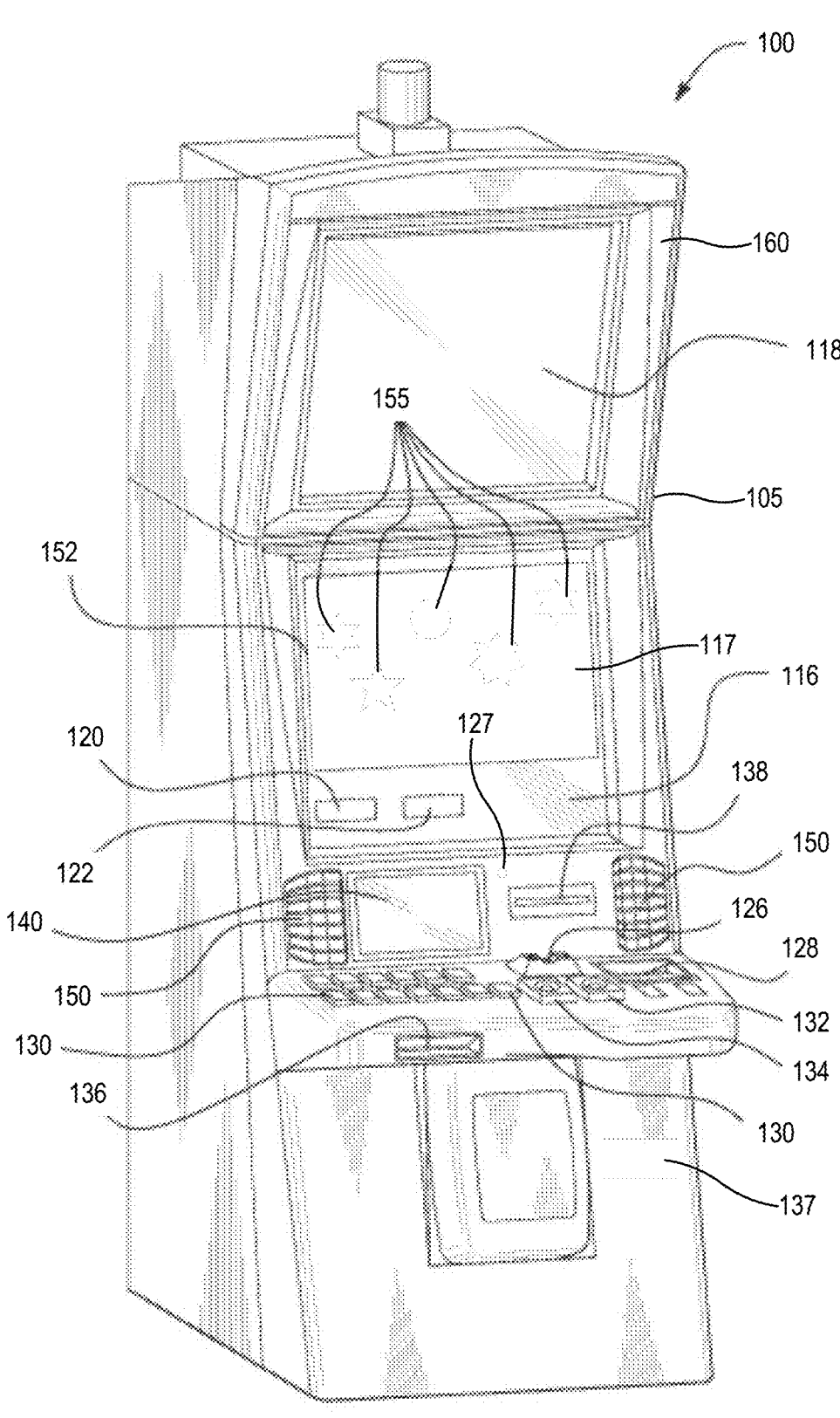
FIG. 2A is a perspective view of a gaming device that can be configured according to some embodiments.
Figure 2B:
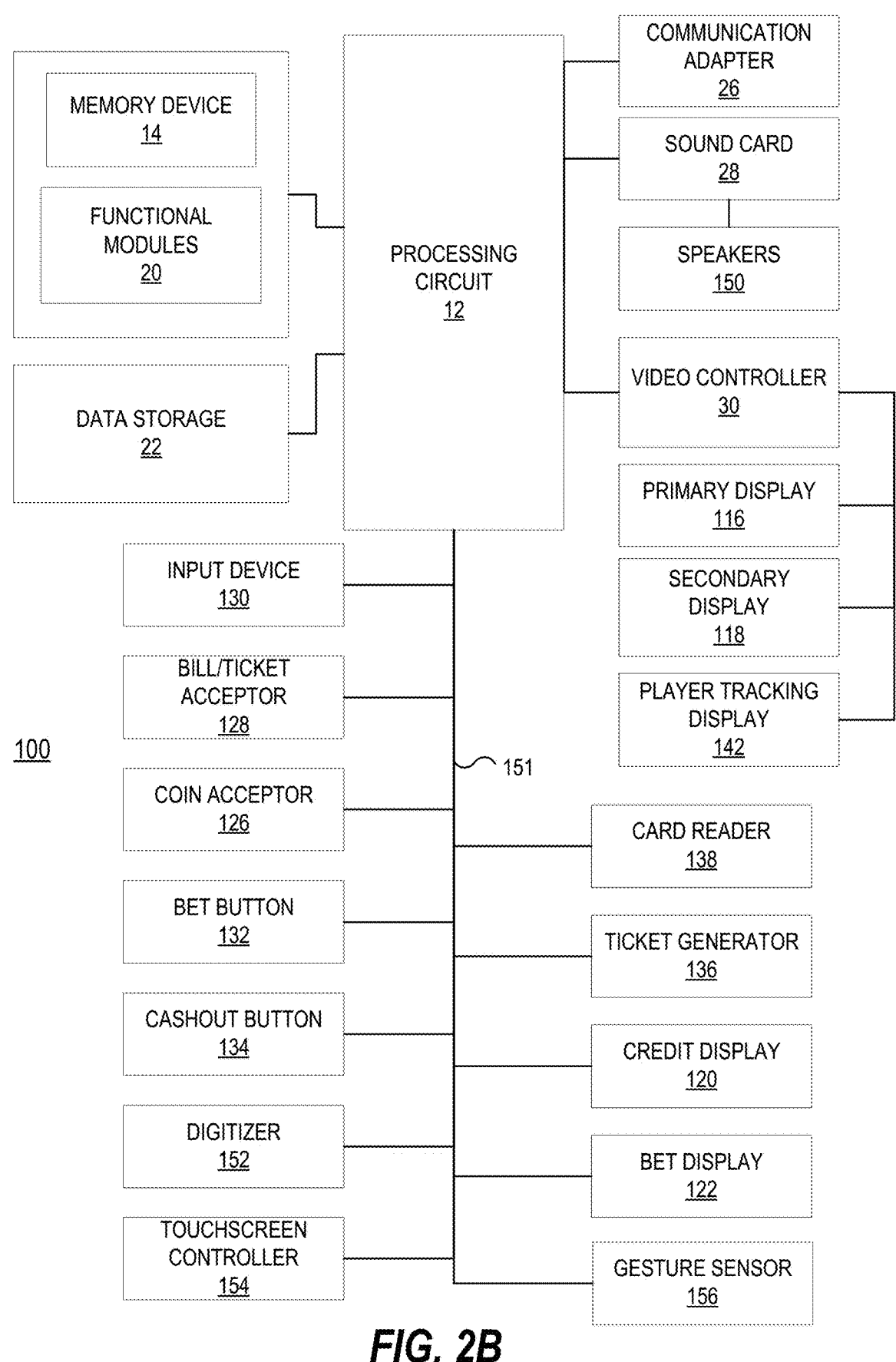
FIG. 2B is a schematic block diagram illustrating an electronic configuration for a gaming device according to some embodiments.
Figure 2C:
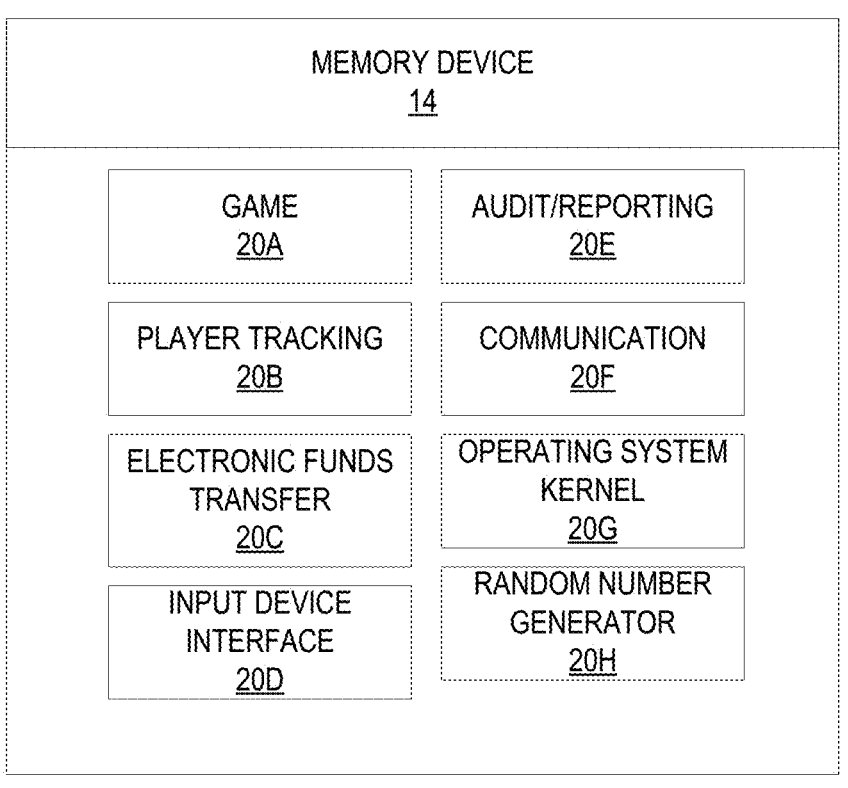
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
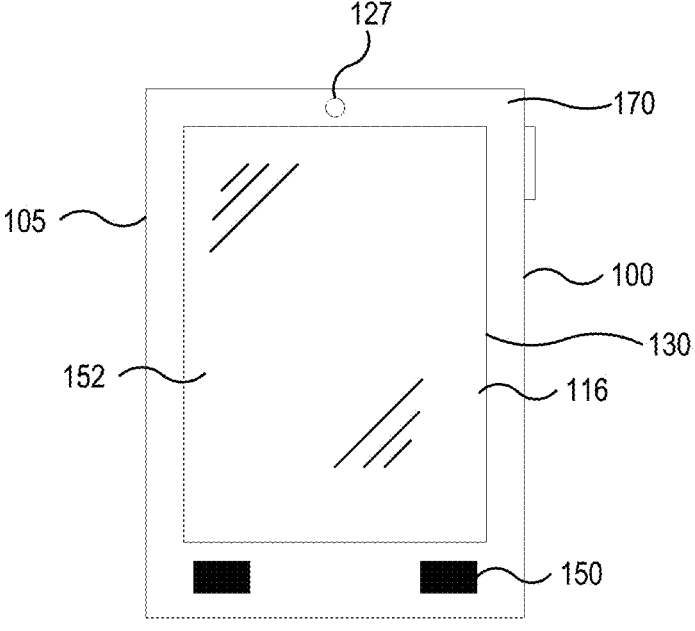
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. One or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
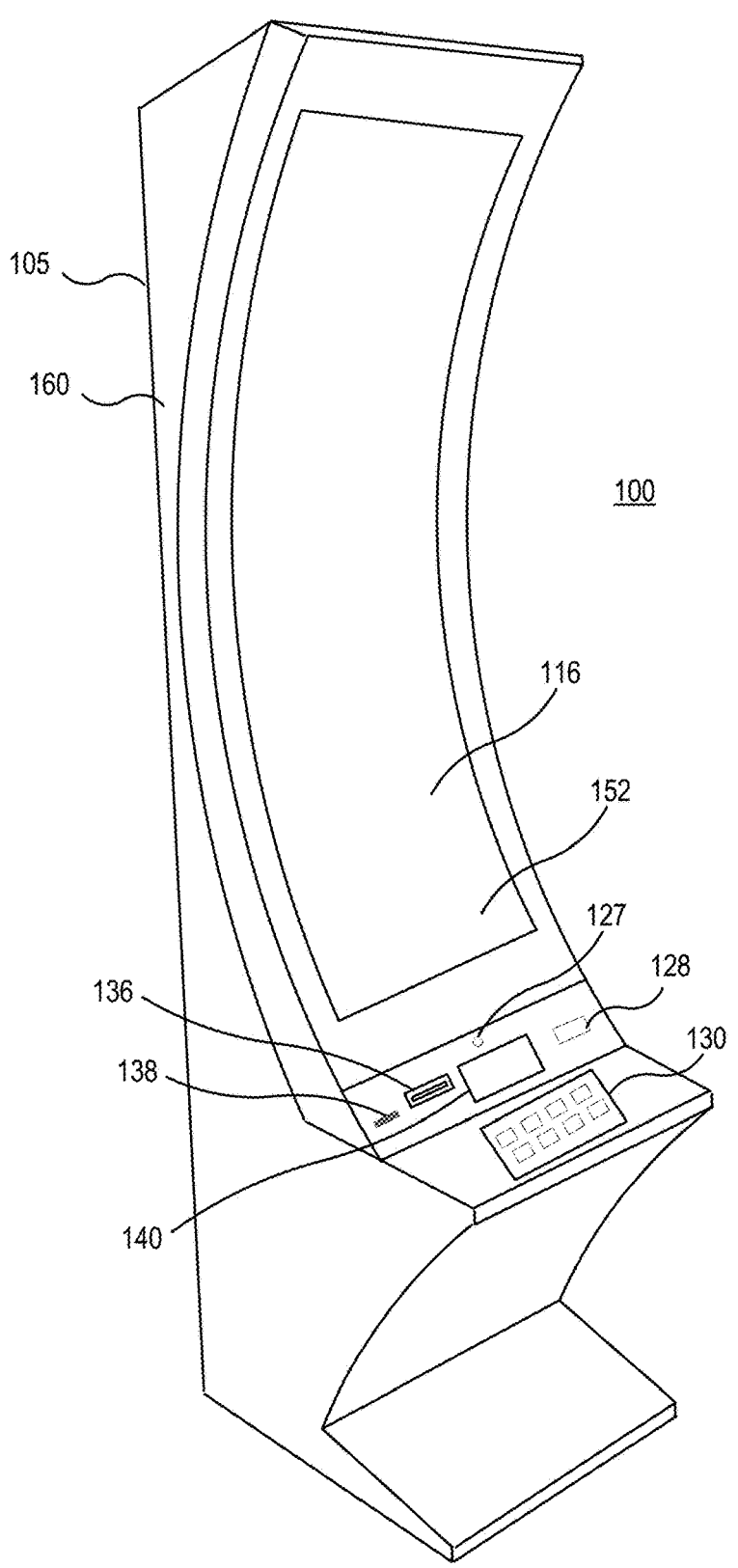
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3A:
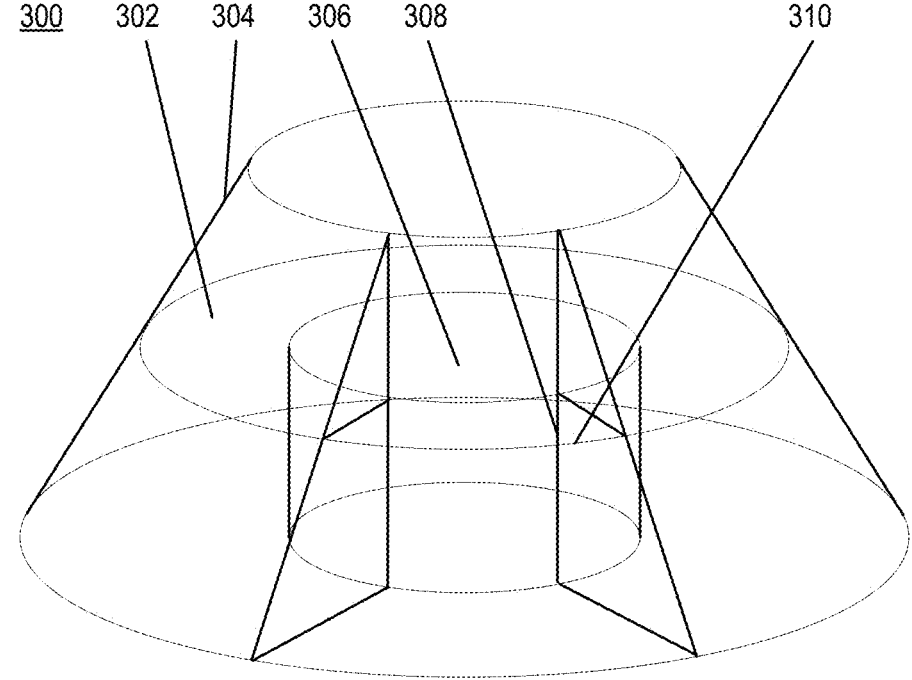
FIGS. 3A-3C illustrate a holographic display system for providing an immersive player experience, according to some embodiments.
Figure 3B:
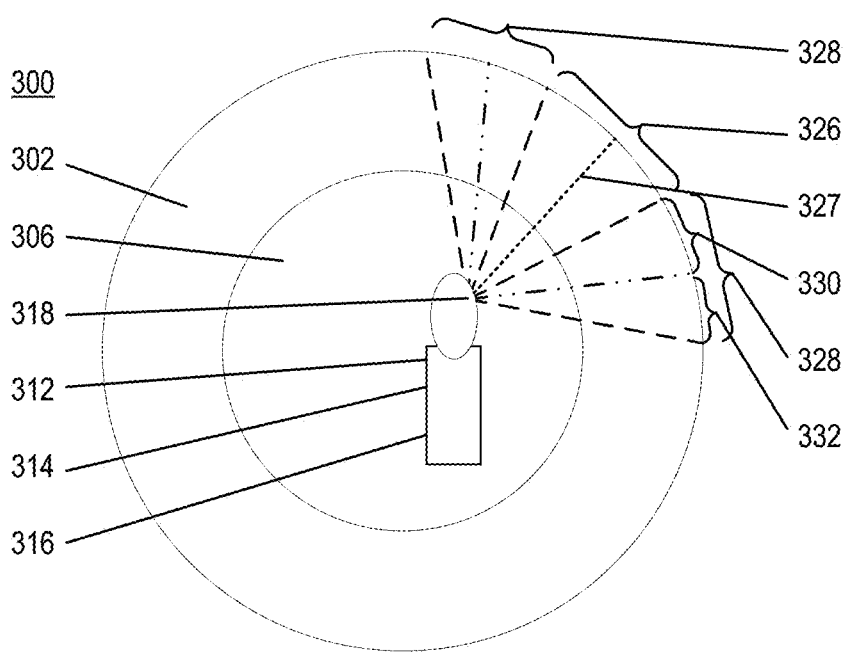
Figure 3C:
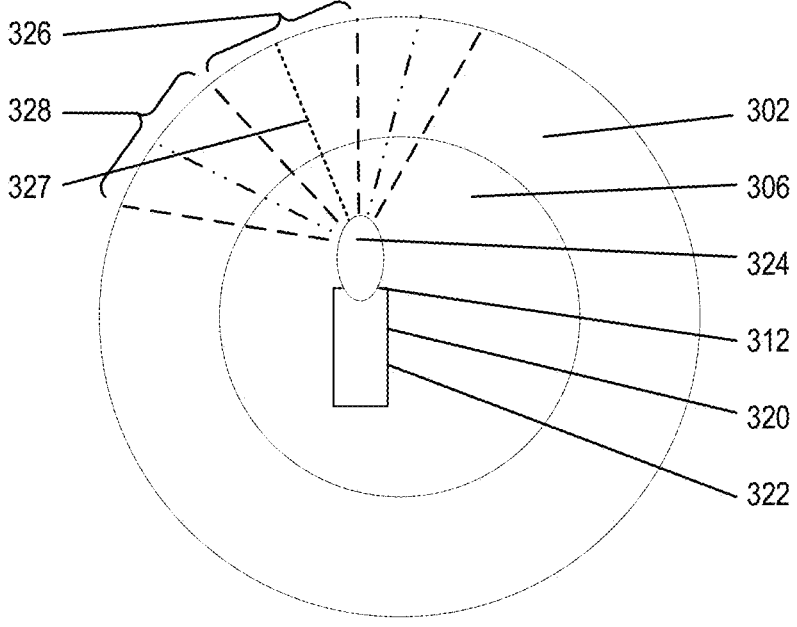

FIGS. 3A-3C illustrate a holographic display system 300 for providing an immersive player experience, according to some embodiments. In this embodiment, the holographic display system 300 includes a plurality of display devices 302 arranged to form an annular ring around a central player area 306. The display devices 302 are arranged horizontally, facing upward toward a reflective surface 304 angled toward the player area 306, e.g., at a 45 degree angle, to project the images displayed by the display devices 302 inwardly toward the player area 306. The display device 302 and reflective surface 304 may be continuous or segmented as desired. For example, the display devices 302 may extend a minimum number of degrees around the player area 306, such as 170 degrees (corresponding to an approximate normal visual field of a human eye), 220 degrees, 270 degrees, etc. The system 300 may include a rear opening 308 for providing access to the player area 306, and may also include a rear door 310 that may include a display device 302 and reflective surface 304 to form a continuous annular ring around the player area 306 for a full 360 degree immersive experience.

A player 312 at a first location 314 in the player area 306 may be detected in a first position 316 and orientation 318, e.g., by a camera array 319. The camera array 319 may also detect movement by the first player 312 to a second location 320, second position 322, and/or second orientation 324. As the player 312 moves and reorients, the display devices 302 may determine a portion of the display in a central field of view 326 and/or peripheral field of view 328 of the player, and may position and reposition graphical elements in the display accordingly.

For example, as shown by FIG. 3B, a player 312 may have a central field of view 326 defined by an angular measurement (e.g., less than 15 degrees, 30 degrees, 45 degrees, etc.) on either side of a line of sight 327 of the player 312 corresponding to the orientation 318, 324 of the player 312. The player 312 may likewise have a peripheral field of view 328 outside the central field of view 326 (e.g., greater than 15 degrees, 30 degrees, 45 degrees, etc.). In some examples, the peripheral field of view 328 may be subdivided into a near peripheral field of view 330 adjacent the central field of view 326 (e.g., between 15 and 45 degrees) and a far peripheral field of view 332 outside the near peripheral field of view 330 (e.g., greater than 45 degrees). As shown in FIG. 3C, in response to the player 312 changing position and/or orientation, the system 300 may determine a new central field of view 326 based on a new line of sight 327 for the player 312, and may modify the presentation for the holographic display 302 accordingly.

Figures 4A, 4B:
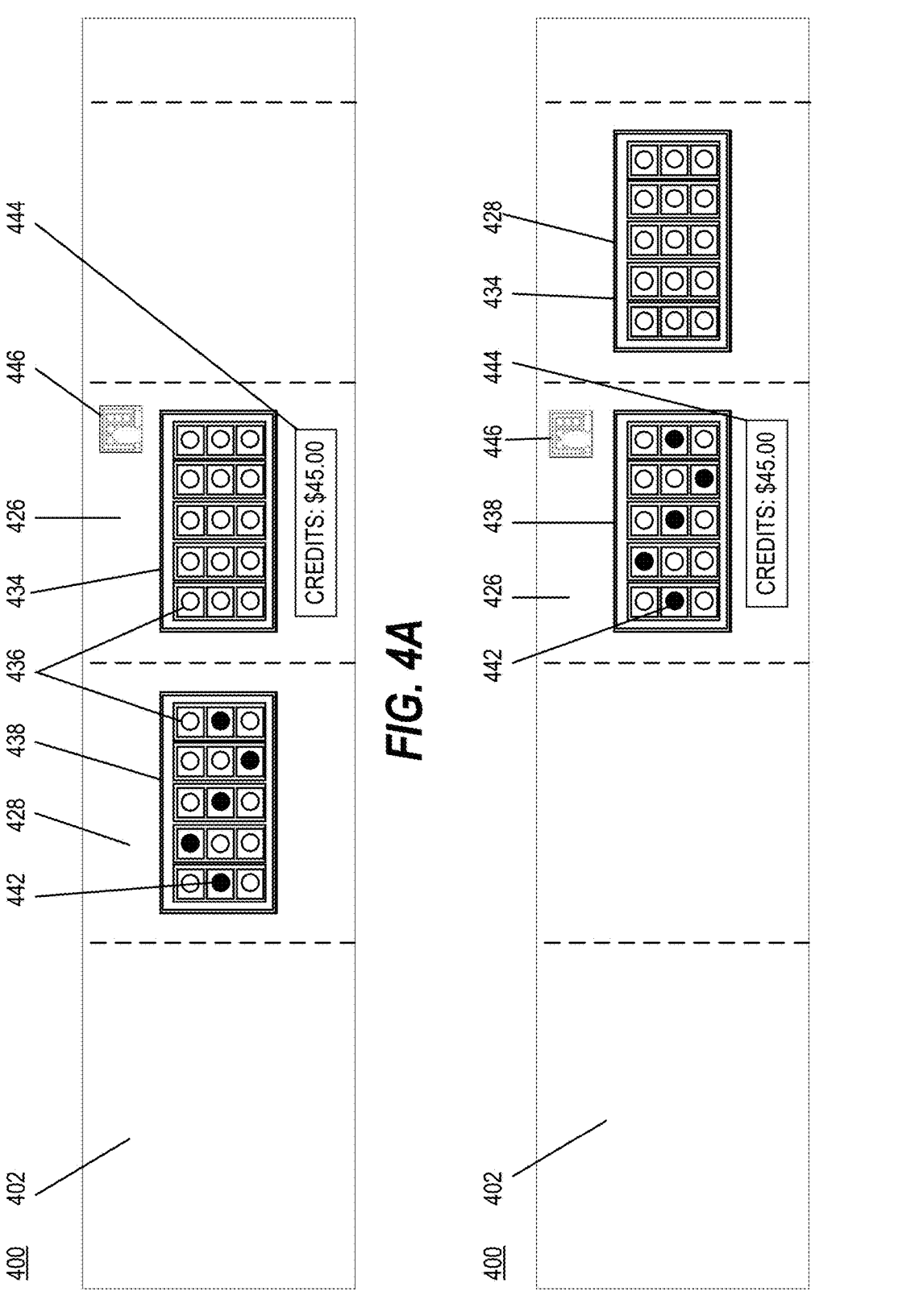
FIGS. 4A-4C illustrate providing a first and second wagering game in a holographic display system, according to some embodiments.
Figure 4C:
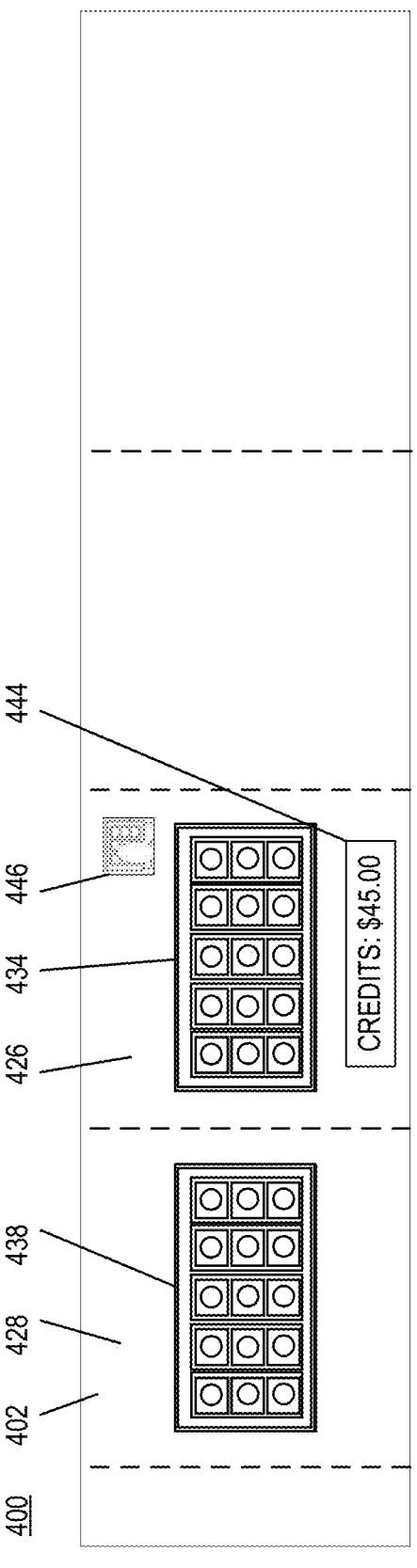

Referring now to FIGS. 4A-4C, providing a wagering game in a holographic display system 400 is illustrated, according to some embodiments. The system 400 may determine a position and an orientation of a player in a player area surrounded by a three-dimensional holographic display 402, which may extend around the player area more than 180 degrees, and up to a full 360 degrees. The holographic display 402 is illustrated as flat in FIGS. 4A-4C for purposes of illustration, but it should be understood that, in this and other examples, the holographic display 402 may be curved, e.g., in an annular arrangement, around the player area to more fully immerse the player, as desired.

As shown in FIG. 4A, the display 402 displays a first wagering game 434 having a plurality of game elements 436 based on the detected position and the orientation of the player, to position the first wagering game 434 in a central field of view 426 of the player. The display 402 also displays a second wagering game 438 based on the detected position and the orientation of the player, to position the second wagering game 438 in a peripheral field of view 428 of the player. For example, the player may be playing both wagering games 434, 438 at the same time, but may be more focused on game play of the first wagering game 434. In some examples, the wagering games may be the same or different game types, such as a slot game, a video poker game, a table game, a sports wagering game, a lottery game, a keno game, a bingo game, a skill game, etc.

As shown by FIG. 4B, based on a game event 442 occurring in the second wagering game, the display 402 may move the second wagering game 438 to position the second wagering game 438 in the central field of view 426 of the player, and may also move the first wagering game 434 to position the first wagering game 434 in the peripheral field of view 428 of the player.

As shown by FIG. 4C, the system 400 may also detect a movement of the player to a second location in the player area, and may determine a second position and a second orientation of the player based on the detected movement of the player, which may result in the player having new field of view, with a second central field of view 427 and a second peripheral field of view 429 for example. In response to the detected movement, the display 402 may move the first wagering game 434 to position the first wagering game 434 in the second central field of view 427 of the player based on the second position and the second orientation of the player, and may move the second wagering game 438 to position the second wagering game 438 in the second peripheral field of view 428 of the player based on the second position and the second orientation of the player.

In some examples, a credit meter 444 simultaneously associated with the first wagering game 434 and the second wagering game 438 (or other graphical element) may be displayed and maintained in the current central field of view 426, 427, regardless of movement of the player and/or repositioning of the first wagering game 434 and/or second wagering game 438, etc. The credit meter 444 and/or other graphical element of the graphical user interface of the display, such as a livestream window 446, for example, may be independently moved and/or modified on the display 402, e.g., in response to player input, separate from the first wagering game and the second wagering game, as desired. The modification of the graphical element and/or other player preferences may be stored in a player profile associated with the player, as desired.

Figures 5A, 5B:
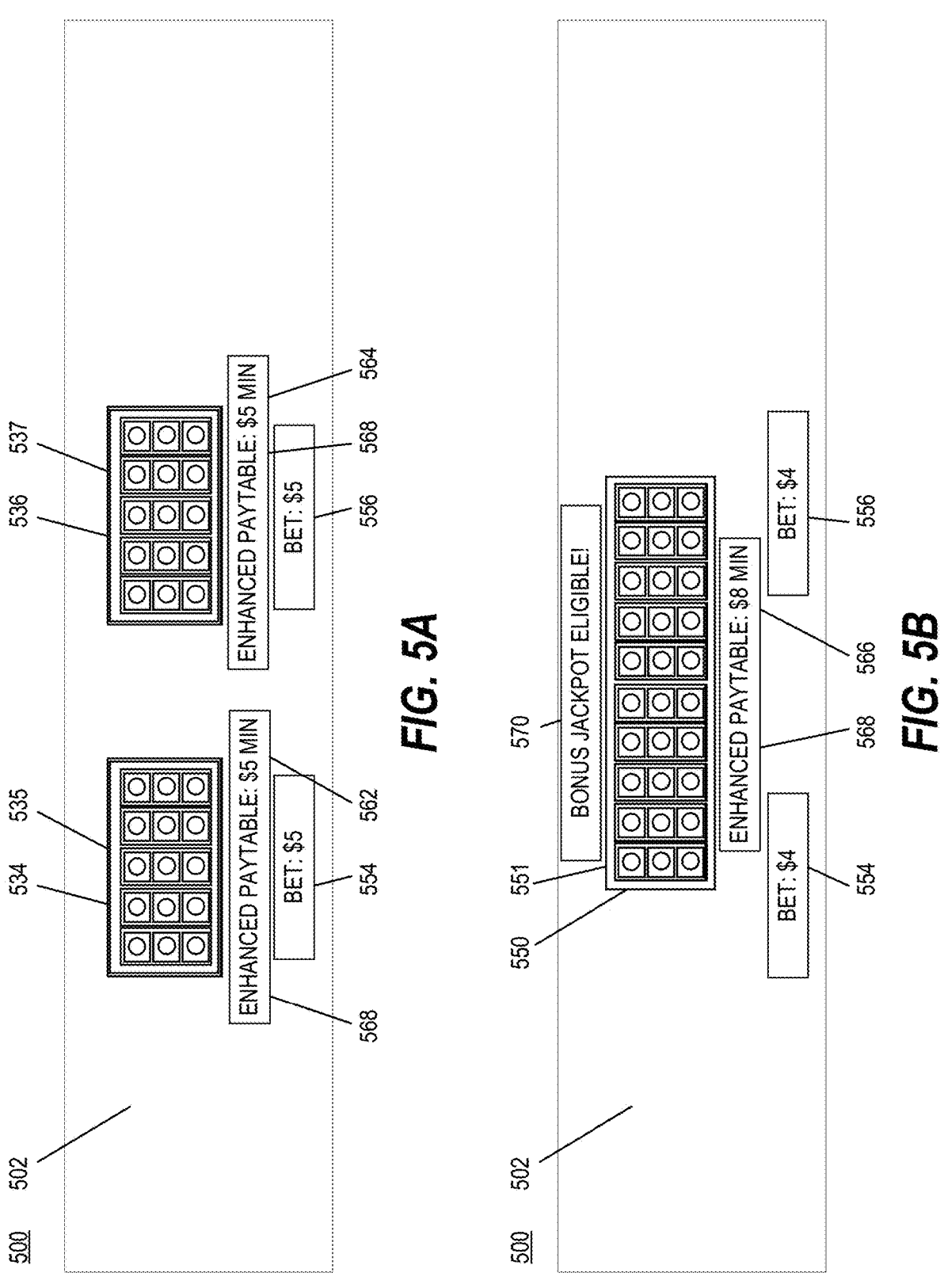
FIGS. 5A and 5B illustrate a combined two-player wagering game in a holographic display system, according to some embodiments.

FIGS. 5A and 5B illustrate an embodiment in which two players playing different wagering games in a holographic display system 500 may play a combined wagering game having additional and/or enhanced features and/or benefits, according to some examples. In this example, a three-dimensional holographic display 502 may display a first game board 535 for a first wagering game 534 based on receipt of a first wager 554 from a first player in the player area for the holographic display system 500, and may display a second game board 537 for a first wagering game 534 based on receipt of a second wager 556 from a second player in the player area.

As shown in FIG. 5B, based on a player input from the first player and/or the second player, the display 502 may combine the first game board 535 and the second game board 537 into a combined game board 551 for a combined wagering game 550. The system 500 may determine a combined game result for the combined wagering game 550 based on the combined game board 551 and, if the combined game result is a winning game result, a first game award may be provided to the first player based on the first wager 554 and a second game award may be provided to the second player based on the second wager 556.

In some examples, the first wagering game 534 may have a first minimum wager amount 562 to qualify for a bonus feature 568 (e.g., an enhanced paytable in this example), and the second wagering game 538 may have a second minimum wager amount 564 (which may be the same as or different from the first minimum wager amount 562) to qualify for the bonus feature 568. In this example, one benefit of the combined wagering game 550 may include a third minimum wager amount 566 to qualify for the bonus feature 568 that is less than a sum of the first minimum wager amount 562 and the second minimum wager amount 564. In some examples, the combined wagering game 550 may include an exclusive bonus feature 570 (e.g., bonus jackpot eligibility in this example) that is not available in the first wagering game 534 or the second wagering game 538.

Figure 6A:
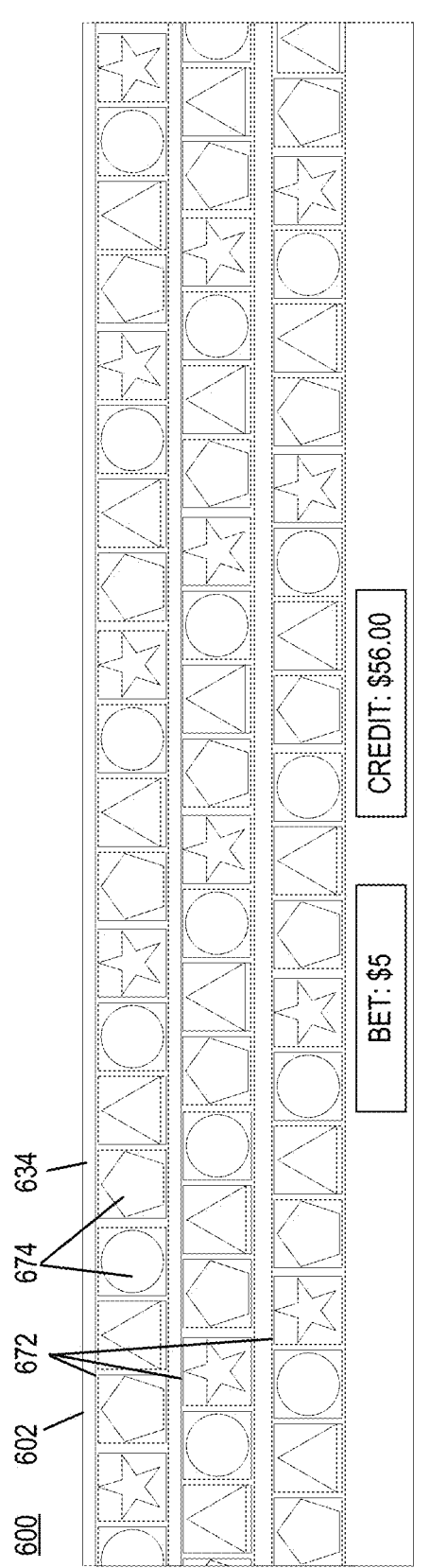
FIGS. 6A and 6B illustrate a slot style wagering game with horizontal reels displayed on a holographic display system, according to some embodiments.
Figure 6B:
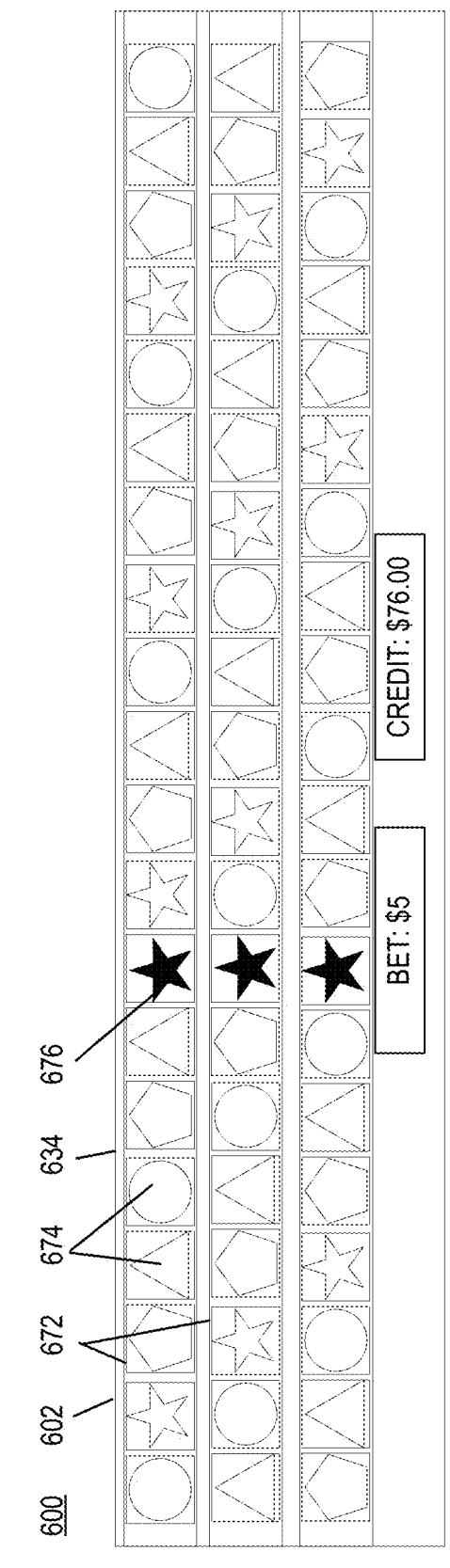

FIGS. 6A and 6B illustrate a three dimensional holographic system 600 for enabling new game features and effects that may not be implemented on conventional EGMs or other gaming devices. For example, as shown in FIG. 6A, the holographic display 602 may display a plurality of horizontal reels 672 for a slot-style wagering game 634, with each reel 672 comprising a plurality of game symbols 674, with each reel 672 extending around the player area, e.g., a minimum of 180 degrees for example. Based on receipt of a wager from a player in the player area for the wagering game 634, the plurality of reels 672 may animate so that the plurality of reels 672 appear to be spinning horizontally around the player area. As shown by FIG. 6B, based on a rest position of the plurality of reels 672 after the animation, a game result 676 may be determined for the wagering game 634 and an award may be provided for a winning game result.

FIG. 7 is a flowchart illustrating operations 700 of systems/methods for facilitating embodiments described herein. The operations 700 may be performed by one or more processor circuits of one or more computing devices, such as any of the computing devices described herein, for example. The operations 700 may include determining, by a processor circuit, a position and an orientation of a player in a player area surrounded by a three-dimensional holographic display device, the display device extending a minimum of 180 degrees around the player area (Block 702). The operations 700 may further include causing the display device to display a first wagering game based on the position and the orientation of the player to position the first wagering game in a central field of view of the player (Block 704). The operations 700 may further include causing the display device to display a second wagering game based on the position and the orientation of the player to position the second wagering game in a peripheral field of view of the player outside the central field of view (Block 706). The operations 700 may further include determining a game event in the second wagering game (Block 708). The operations 700 may further include, based on the determined game event, cause the display device to move the second wagering game to position the second wagering game in the central field of view of the player (Block 710).

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet or other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:
a processor circuit; and
a memory coupled to the processor circuit, the memory comprising non-transitory machine-readable instructions that, when executed by the processor circuit, cause the processor circuit to:
determine a position and an orientation of a player in a player area surrounded by a three-dimensional holographic display device, the display device extending a minimum of 180 degrees around the player area;
cause the display device to display a first wagering game based on the position and the orientation of the player to position the first wagering game in a central field of view of the player;
cause the display device to display a second wagering game based on the position and the orientation of the player to position the second wagering game in a peripheral field of view of the player outside the central field of view;
determine a game event in the second wagering game; and
based on the determined game event, cause the display device to move the second wagering game to position the second wagering game in the central field of view of the player.

2. The system of claim 1, wherein the instructions further cause the processor circuit to, based on the determined game event, cause the display device to move the first wagering game to position the first wagering game in the peripheral field of view of the player.

3. The system of claim 1, wherein the instructions further cause the processor circuit to:
detect a movement of the player to a second location in the player area;
determine a second position and a second orientation of a player in the player area based on the detected movement of the player; and
cause the display device to move the first wagering game to position the first wagering game in a second central field of view of the player based on the second position and the second orientation of the player.

4. The system of claim 3, wherein the instructions further cause the display device to move the second wagering game to position the second wagering game in a second peripheral field of view of the player based on the second position and the second orientation of the player.

5. The system of claim 1, wherein the instructions further cause the display device to display a credit meter in the central field of view of the player, the credit meter being simultaneously associated with the first wagering game and the second wagering game.

6. The system of claim 5, wherein the first wagering game comprises a first game type comprising one of a slot game, a video poker game, a table game, a sports wagering game, a lottery game, a keno game, a bingo game, and a skill game, and
wherein the second wagering game comprises a second game type different from the first game type, the second game type comprising one of a slot game, a video poker game, a table game, a sports wagering game, a lottery game, a keno game, a bingo game, and a skill game.

7. The system of claim 1, wherein the instructions further cause the display device to, based on player input, modify a user interface element of a graphical user interface (GUI) being displayed by the display device.

8. The system of claim 7, wherein the modification of the user interface element comprises movement of an element separate from the first wagering game and the second wagering game.

9. The system of claim 7, wherein the instructions further cause the processor circuit to store the modification of the user interface element in a player profile associated with the player.

10. The system of claim 1, wherein the display device extends a minimum of 220 degrees around the player area.

11. The system of claim 1, wherein the display device extends a minimum of 170 degrees around the player area.

12. The system of claim 1, wherein the central field of view is less than 15 degrees on either side of a line of sight of the player corresponding to the orientation of the player, and wherein the peripheral field of view is greater than 15 degrees on either side of the line of sight of the player.

13. The system of claim 1, wherein the central field of view is less than 30 degrees on either side of a line of sight of the player corresponding to the orientation of the player, and wherein the peripheral field of view is greater than 30 degrees on either side of the line of sight of the player.

14. The system of claim 1, wherein the central field of view is less than 45 degrees on either side of a line of sight of the player corresponding to the orientation of the player, and wherein the peripheral field of view is greater than 45 degrees on either side of the line of sight of the player.

15. The system of claim 1, wherein the peripheral field of view comprises a near peripheral field of view adjacent the central field of view and a far peripheral field of view outside the near peripheral field of view, and wherein the instructions further cause the processor device to:

cause the display device to display a third wagering game based on the position and the orientation of the player to position the first wagering game in the far peripheral field of view of the player;

determine a game event in the second wagering game; and based on the determined game event, cause the display device to move the third wagering game to position the third wagering game in the central field of view of the player.

16. The system of claim 15, wherein the central field of view is less than 15 degrees on either side of a line of sight of the player corresponding to the orientation of the player, and wherein the near peripheral field of view is greater than 15 degrees and less than 45 degrees on either side of the line of sight of the player, and wherein the far peripheral field of view is greater than 45 degrees on either side of the line of sight of the player.

17. A gaming device comprising:

a three-dimensional holographic display device extending a minimum of 180 degrees around a player area;

a processor circuit; and a memory coupled to the processor circuit, the memory comprising non-transitory machine-readable instructions that, when executed by the processor circuit, cause the processor circuit to:

based on receipt of a first wager from a second player in the player area for a first wagering game, display a first game board for a first wagering game;

based on receipt of a second wager from a second player in the player area for a second wagering game, display a second game board for a second wagering game;

based on a player input from the first player and the second player, combine the first game board and the second game board into a combined game board for a combined wagering game;

determine a combined game result for the combined wagering game based on the combined game board; and based on a determination that the combined game result is a winning game result, provide a first game award to the first player based on the first wager and a second game award to the second player based on the second wager.

18. The gaming device of claim 17, wherein the first wagering game comprises a first minimum wager amount to qualify for a bonus feature, wherein the second wagering game comprises a second minimum wager amount to qualify for the bonus feature, and wherein the combined wagering game comprises a third minimum wager amount to qualify for the bonus feature, wherein the third minimum wager amount is less than a sum of the first minimum wager amount and the second minimum wager amount.

19. The gaming device of claim 17, wherein the combined wagering game comprises a bonus feature that is not available in the first wagering game or the second wagering game.

20. A gaming device comprising:

a three-dimensional holographic display device extending a minimum of 180 degrees around a player area;

a processor circuit; and a memory coupled to the processor circuit, the memory comprising non-transitory machine-readable instructions that, when executed by the processor circuit, cause the processor circuit to:

cause the display device to display a plurality of horizontal reels for a wagering game, each reel comprising a plurality of game symbols, each reel extending a minimum of 180 degrees around the player area;

based on receipt of a wager from a player in the player area for the wagering game, animate the plurality of reels so that the plurality of reels appear to be spinning horizontally around the player area;

based on a rest position of the plurality of reels after the animation, determine a game result for the wagering game; and in response to the game result being a winning game result, provide a game award to the player.

* * * * *